United States Patent [19]

Sim

[11] Patent Number: 5,748,587
[45] Date of Patent: May 5, 1998

[54] SPINDLE SERVO CIRCUIT IN HIGH-SPEED OPTICAL DISK REPRODUCER

[75] Inventor: Tae-Hyeon Sim, Seoul, Rep. of Korea

[73] Assignee: Samsung Electronics Co., Ltd., Kyungki-do, Rep. of Korea

[21] Appl. No.: 678,593

[22] Filed: Jul. 15, 1996

[30] Foreign Application Priority Data

Oct. 6, 1995 [KR] Rep. of Korea ............... 95-34321

[51] Int. Cl.$^6$ ............................................. G11B 7/00
[52] U.S. Cl. .......................... 369/50; 369/54; 369/124
[58] Field of Search ........................... 369/50, 54, 58, 369/59, 32, 47, 48, 124

[56] References Cited

U.S. PATENT DOCUMENTS

| | | | |
|---|---|---|---|
| 5,508,983 | 4/1996 | Nakmura et al. | 369/32 |
| 5,521,895 | 5/1996 | Miura et al. | 369/50 |
| 5,528,574 | 6/1996 | Takeuchi et al. | 369/50 |
| 5,636,192 | 6/1997 | Shimizume et al. | 369/48 |

*Primary Examiner*—David C. Nelms
*Assistant Examiner*—Kim-Kwok Chu
*Attorney, Agent, or Firm*—Sughrue, Mion, Zinn, Macpeak & Seas, PLLC

[57] ABSTRACT

A spindle servo circuit in an optical disc reproducing apparatus operates with enhanced stability at disc rotation speeds substantially higher than normal. The spindle servo circuit includes a first phase comparator which compares the phases of a reference clock signal and a reproduced frame clock signal and outputs a phase difference signal. The spindle servo circuit also includes a first low pass filter for generating a revolution speed control signal for a spindle motor by low-pass filtering the phase difference signal. The revolution speed control signal is input to a motor driving means for driving revolution of a spindle motor, which in turn spins the optical disc. Optical signals are picked up off the disc and run through a high frequency amplifier for amplifying and wave-shaping to produce a reproduction data signal. A phase locked loop circuit generates a reproduced bit clock signal from the reproduced data signal during normal operation, and during high speed operation (above a predetermined speed) generates the reproduced bit clock signal corresponding to a previous state. Thereby, in the spindle servo control system for operating at higher than normal speed, according to the present invention, the servo control system can be maintained in a stable state by fixing the phase synchronous loop of an accurate servo control system at a predetermined high speed, to allow stable restoration of data when operating at high speed.

5 Claims, 3 Drawing Sheets

SPINDLE SERVO CIRCUIT IN HIGH-SPEED OPTICAL DISK REPRODUCER

BACKGROUND OF THE INVENTION

The present invention relates to an optical disc reproducing apparatus, and more particularly, to a spindle servo circuit in a high-speed optical disc reproducer which is capable of stably demodulating data at a high speed.

In an optical disc player such as a Compact Disc Player (CDP), a Laser Disc Player (LDP) or a Magneto-Optical Disc Drive (MODD), a spindle servo controls the revolution of an optical disc. There are two types of spindle servos for use in optical disc players: a constant linear velocity (CLV) type in which a revolution speed of a disc varies according to the radial distance of a pickup from the center of the disc, and a constant angular velocity (CAV) in which a revolution speed of a disc is fixed. A compact disc player as proposed by Sony/Phillips adopts the CLV type servo.

In the CDP, the stable and accurate demodulation of data recorded in a disc depends on the controlling of disc revolution by the spindle servo system. Accordingly, the spindle servo system becomes very important in demodulating data stably and accurately for a CDP system operating at higher-speeds.

The eccentricity rate of a disc highly affects the spindle servo system when the disc rotates. A disc in normal condition is formed of a spiral structure in which a track where data is recorded bears a circular shape.

However, a disc which is exposed to inferior conditions of temperature, humidity, and etc. during or after manufacturing takes on an eccentric shape of a spiral structure having a elliptical shape.

CDP provisions specify that a CDP system should perform correct demodulation of data even though a disc has an eccentricity rate of ±70 μm relative to the center hole of the disc.

FIG. 1 is a block diagram illustrating a conventional spindle servo system of an optical disc reproducer. A servo circuit of the optical disc reproducer reads out data by means of an optical pickup 14 from an optical disc 12 which is rotated by a spindle motor 10. The read-out data which is a high frequency signal having eye patterns is amplified and wave-shaped through a high frequency amplifier 16, and output as an EFMI of a pulse waveform by zero-crossing detection of the eye patterns. The EFMI which is input to an EFM demodulator 20 is demodulated so as to be restored as 8-bit data. Also, EFM demodulator 20 includes a PLL circuit comprising a second phase comparator 22, a second low pass filter 24, a voltage control oscillator 26 and a third divider 28. A reproduced bit clock signal (PLCK) of 4.3218 MHz (7.35 kHz×588) consisting of a series of pulse rows is generated through the PLL circuit, and the PLCK is transferred to a servo circuit unit 30. In servo circuit unit 30, a reference clock signal (RFCK) of 7.35 kHz is generated through an oscillator 31 and a first divider 32, and a frame clock signal (WFCK) of 7.35 kHz is generated which is obtained by dividing the applied PLCK by a second divider 33. A first phase comparator 34 outputs a phase difference detection signal by comparing phases of the WFCK and RFCK. The detected phase difference detection signal is made smooth by a first low pass filter 35 and applied to a motor driver 40. Motor driver 40 controls speed of spindle motor 10 in response to the level of the applied smooth voltage signal.

FIG. 2 is a circuit diagram showing a detailed structure of the phase comparator of the PLL of the EFM demodulator of FIG. 1. In FIG. 2, second phase comparator 22 receives the EFMI and PLCK and compares the phases of the same in a phase comparing circuit 22A and outputs first and second phase difference detection signals (VU and VD). An output driving circuit unit 22B comprises a P-MOS transistor (PT) for pulling up an output node (PDO) by receiving the VU signal and an N-MOS transistor (NT) for pulling down the PDO in response to the VD signal.

The VU and VD signals may have three output states as follows. First, when VD="H" and VU="H" ("H" denoting a "high" state), the PT and NT turn off and on, respectively, so that the PDO becomes "L" ("L" denoting a "low" state). Second, when VD="L" and VU="L", the PT and NT turn on and off, respectively, so that the PDO becomes "H". Lastly, when VD="L" and VU="H", both the PT and NT turn off, so that the PDO becomes a high impedance state.

As described above, the spindle servo system in the conventional optical disc reproducer can be divided into two control systems.

The spindle servo system itself schematically controls demodulation of data by controlling revolution of a disc as a first control system. The second control system is a PLL for EFM demodulation, which performs accurate control for precise demodulation of data.

In the conventional spindle servo system, the PLL for EFM demodulation operates at all times, regardless of the level of the output voltage SP+ of the first low pass filter 35. However, the result of experiments indicates that when the SP+ output voltage becomes more than 1.5 times of voltage at a normal speed, the system operates abnormally, slightly generating noise. In this situation, if the PLL for EFM demodulation continues to operate, stability of the servo control system becomes more inferior.

SUMMARY OF THE INVENTION

To solve the above problems, it is an object of the present invention to provide a spindle servo circuit in a manyfold-speed optical disc reproducer which can stabilize the spindle servo control system by maintaining the PLL operation of an EFM demodulator of a previous state in a high-speed state.

Accordingly, to achieve the above object, there is provided a spindle servo circuit in a high speed optical disc reproducing apparatus which has a first phase comparator for comparing the phases of a reference clock signal and a reproduced frame clock signal and outputting a phase difference signal; a first low pass filter for generating a revolution speed control signal of a spindle motor by low-pass filtering the phase difference signal; a motor driving means for driving revolution of the spindle motor in response to the revolution speed control signal; a high frequency amplifier for amplifying and wave-shaping a high frequency signal reproduced from an optical disc which is rotated by the spindle motor and outputting a reproduced data signal; a phase locked loop circuit for generating a reproduced bit clock signal from the reproduced data signal during normal operation, and maintaining generation of the reproduced bit clock signal of a previous state in response to the revolution speed control signal when over a predetermined speed; and a first divider for dividing the reproduced bit clock signal and generating the reproduced frame clock signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
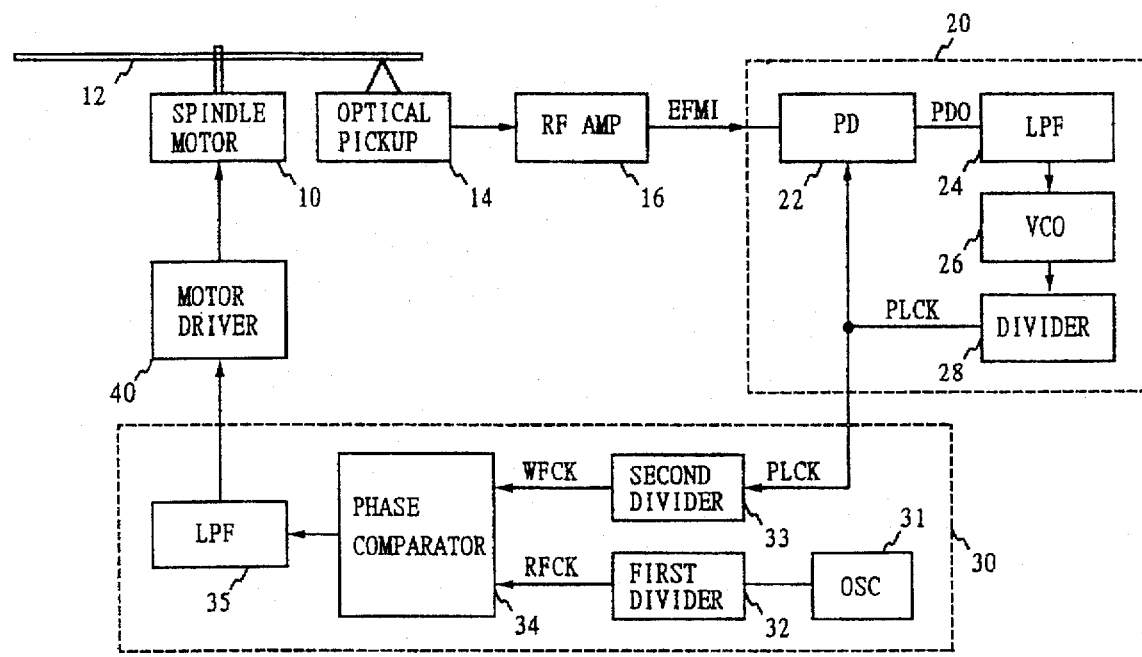
FIG. 1 is a block diagram illustrating a conventional spindle servo system of an optical disc reproducer.
Figure 2:
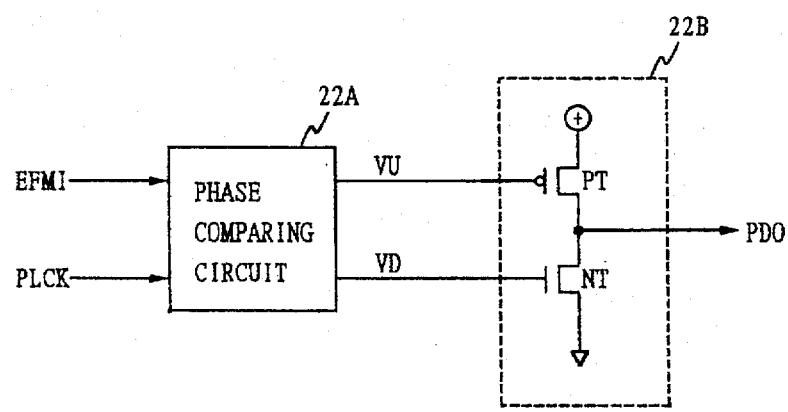
FIG. 2 is a circuit diagram showing a detailed structure of the phase comparator of the PLL of the EFM demodulator of FIG. 1.
Figure 3:
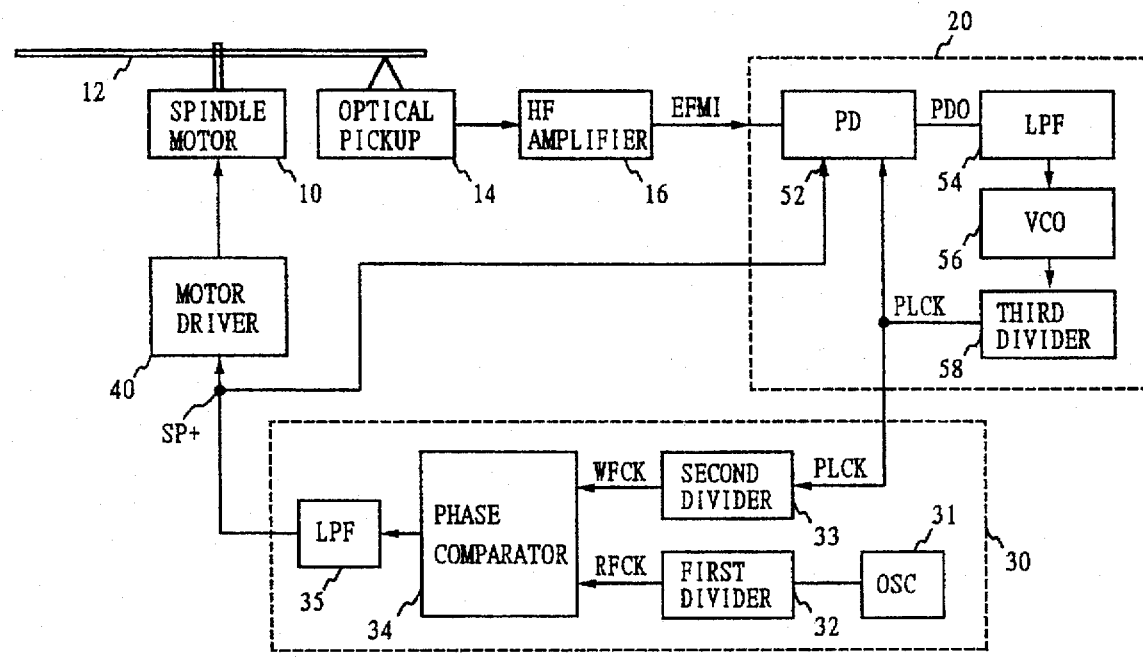
FIG. 3 is a block diagram illustrating a spindle servo circuit in an optical disc reproducer according to a preferred embodiment of the present invention.

FIG. 3 is a block diagram illustrating a spindle servo circuit in an optical disc reproducer according to a preferred embodiment of the present invention.

The spindle servo circuit includes a spindle servo controller 30 which generates a frame clock signal (WFCK) by dividing a reproduced bit clock signal, detects a phase difference detection signal by comparing the WFCK and a reference clock signal (RFCK), and generates a revolution speed control signal (SP+) for a spindle motor 10 by low-pass filtering the detected phase difference detection signal. The spindle servo circuit also includes a motor driver 40 for driving spindle motor 10 in response to the SP+ signal. High frequency amplifier 16 outputs an EFMI signal by amplifying and wave-shaping a high frequency signal reproduced from a compact disc 12 which is rotated by spindle motor 10. The EFM demodulation circuit unit 50 generates PLCK of spindle servo controller 30 from the EFMI signal such that it maintains generation of the PLCK of a previous state in response to the condition where the SP+ signal is over a predetermined level corresponding to a predetermined higher than normal speed.

Spindle servo controller 30 comprises a first phase comparator 34 for outputting the phase difference detection signal by comparing the phases of the RFCK (which is obtained through an oscillator 31 and first divider 32) and the WFCK, and a first low pass filter 35 for generating the SP+ signal for spindle motor 10 by low-pass filtering the phase difference detection signal.

An EFM demodulation circuit 50 is provided with a phase locked loop (PLL) circuit. The PLL circuit has a second phase comparator 52 for outputting the phase difference detection signal by comparing the phases of a reproduction data signal EFMI and the PLCK, but, maintaining an output in a "disable" state in response to the revolution speed control signal SC+ when a predetermined speed is exceeded. The PLL circuit also has a second low pass filter 54 for generating a control voltage signal by low-pass filtering the phase difference detection signal PDO, a voltage control oscillator 56 for generating a predetermined frequency signal in response to the control voltage signal received from LPF 54, and a third divider 58 for generating the PLCK by dividing the predetermined frequency signal.

Figure 4:
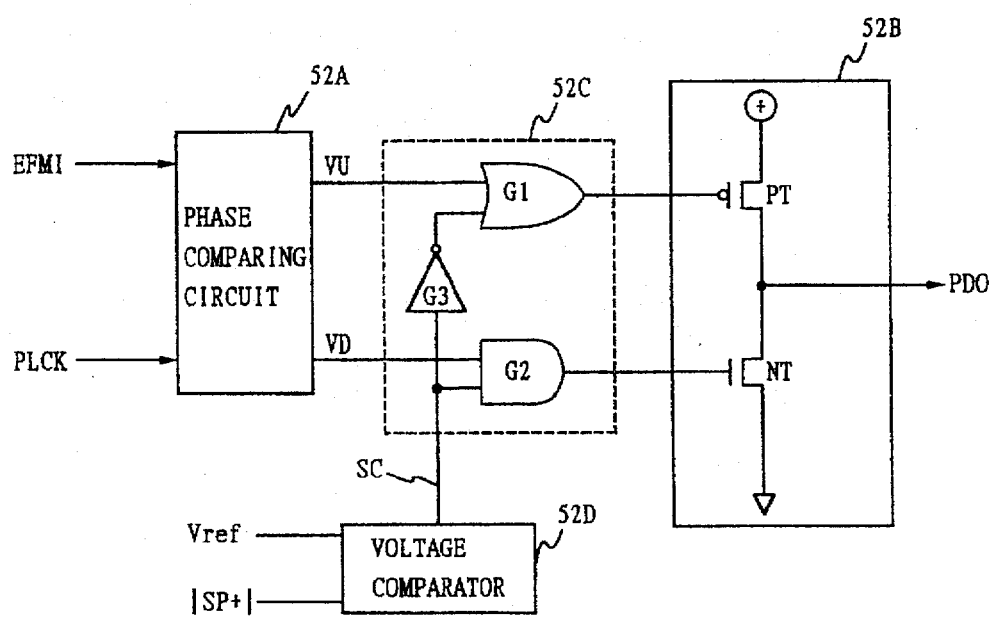
FIG. 4 is a circuit diagram illustrating a detailed structure of the phase comparator of the PLL of the EFM demodulator of FIG. 3.

As shown in FIG. 4, second phase comparator 52 comprises a phase comparison circuit 52A for separately outputting first and second phase difference detection signal VU and VD by comparing the phases of the EFMI signal and PLCK, a voltage comparator 52D for generating a switching control signal SC by comparing the SP+ and a reference voltage signal Vref corresponding to a predetermined higher than normal speed, a switching means 52C for switching the VU and VD in response to the SC, and an output driving circuit 52B for outputting a phase difference signal PDO by means of the VU and VD passed through switching means 52C.

Figure 5:
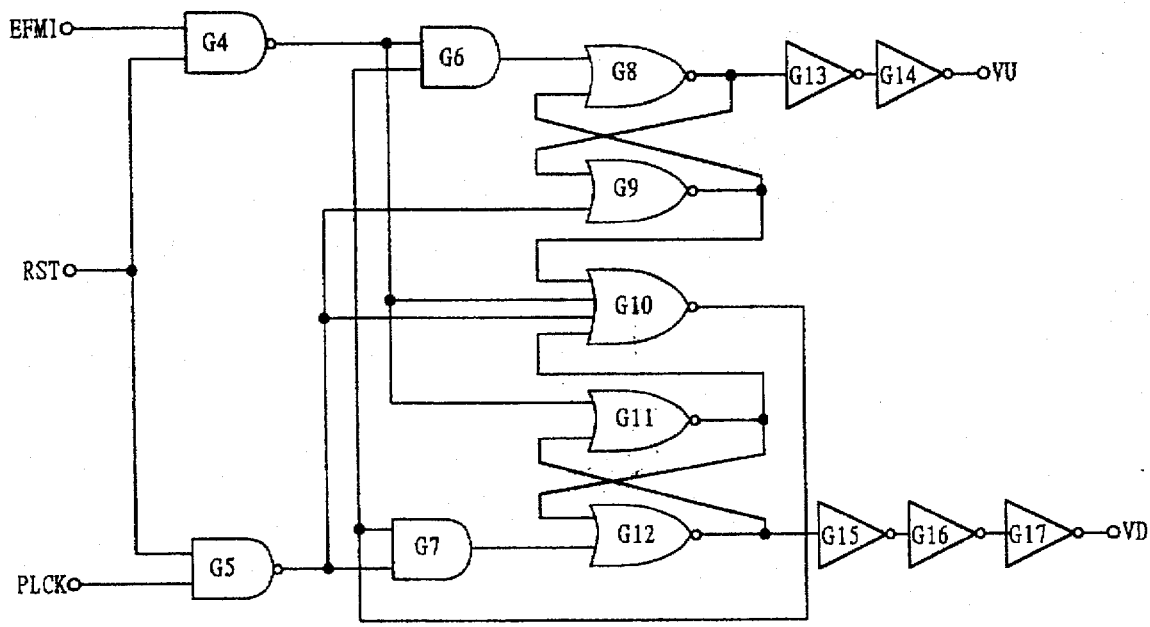
FIG. 5 is a detailed circuit diagram showing the phase comparison circuit of FIG. 4.

As shown in FIG. 5, phase comparison circuit 52A comprises NAND gates G4 and G5, AND gates G6 and G7, NOR gate G8–G12 and inverters G13–G17. That is, phase comparison circuit 52A receives the EFMI and PLCK and compares the phases of both signals. Then, when the phase of the EFMI leads (goes earlier than) the PLCK, the VU maintains a "low" state for a length of time corresponding to the phase difference. On the contrary, when the phase of the PLCK leads (goes earlier than) the EFMI, the VD maintains a "high" state for a length of time corresponding to the phase difference.

The detailed description of output driving circuit 52B will be omitted since the circuit and structure thereof is the same as the conventional ones.

Switching means 52C comprises an OR gate G1, an inverter G3 and an AND gate G2 for switching the VU and VD by the SC.

Figure 6:
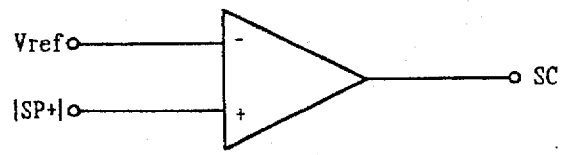
FIG. 6 is a view illustrating a structure of the voltage comparator of FIG. 4.
Figure 7:
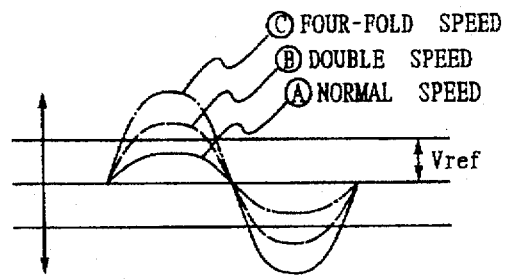
FIG. 7 is a view showing waveforms for explanation of the operation of the voltage comparator of FIG. 6.

As shown in FIG. 6, voltage comparator 52D compares the SP+ and Vref corresponding to a predetermined speed, and outputs the SC to have a "low" state when the absolute value of the SP+ becomes greater than that of Vref as shown in FIG. 7. As shown in FIG. 7, (A), (B), and (C) of the SP+ indicate outputs at a normal speed, double speed, and four-fold speed, respectively. When the spindle servo system is implemented into the same system for all the speed of normal, double, and four-fold, the SP+ signal increases according to increase of speed as shown in the drawing. This means that high voltage is needed for controlling a disc having eccentricity of the same amount, as revolution speed increases.

When the SP+, an LPF output signal, reaches over 1.5 times greater then output voltage at a normal speed, demodulation of data can be performed stably by maintaining the operation of PLL for EFM demodulation is in a previous state.

With a reference voltage of 1.5 times greater than the SP+ of low pass filter 35 at a normal speed, voltage comparator 52D compares the absolute value of the SP+, when an average level of the actual SP+ value is 0Volts. Thus, when the absolute value of SP+ is greater than Vref, the SC is output in a "low" state.

When the SC is in a "high" state, the VU and VD pass through switching means 52C and are transmitted to output driving circuit 52B.

When the SC is in a "low" state, the VU and VD levels output to driving circuit 52B become "H" and "L", respectively, regardless of the state of the VU and VD as input to the switching means 52C. Also, the PDO maintains a high impedance state so that data demodulation is performed stably since the PLL maintains the previous state at the moment the SC becomes "low."

As described above, in the spindle servo control system according to the present invention for operating at speeds many-fold of normal, the servo control system can be maintained in a stable state by fixing the phase locked loop of an accurate servo control system in a predetermined higher than normal speed of a schematic servo control system, thereby stably restoring data when at high speed.

Although the present invention has been illustrated by description of a preferred embodiment, persons of skill in the art will appreciate that modifications can be made to the illustrated embodiment without departing from the spirit or scope of the invention.

What is claimed is:

1. A spindle servo circuit in an optical disc reproducing apparatus comprising:

a first phase comparator for comparing the phases of a reference clock signal and a reproduced frame clock signal and outputting a phase difference signal;

a first low pass filter for generating a revolution speed control signal for a spindle motor by low-pass filtering the phase difference signal;

a motor driving means for driving revolution of the spindle motor in response to the revolution speed control signal;

a high frequency amplifier for amplifying and wave-shaping a high frequency signal reproduced from an optical disc which is rotated by the spindle motor and outputting a reproduced data signal;

a phase locked loop circuit for generating a reproduced bit clock signal from the reproduced data signal during normal operation, and maintaining generation of the reproduced bit clock signal according to a previous state in response to the revolution speed control signal when over a predetermined speed; and a first divider for dividing the reproduced bit clock signal and generating said reproduced frame clock signal.

2. A spindle servo circuit in an optical disc reproducing apparatus according to claim 1, wherein said phase locked loop circuit comprises:

a second phase comparator for outputting a phase difference detection signal by comparing the phases of the reproduced data signal and the reproduced bit clock signal during normal operation, and maintaining an output in a disable state in response to the revolution speed control signal when exceeding a predetermined amplitude;

a second low pass filter for generating a control voltage signal by low-pass filtering the phase difference detection signal;

a voltage controlled oscillator for generating a controlled frequency signal in response to the control voltage signal; and a third divider for generating the reproduced bit clock signal by dividing said controlled frequency signal.

3. A spindle servo circuit in an optical disc reproducing apparatus according to claim 2, wherein said second phase comparator comprises:

a phase comparison circuit for separately outputting first and second phase difference detection signals by comparing the phases of said reproduced data signal and said reproduced bit clock signal;

a voltage comparator for generating a switching control signal by comparing the revolution speed control signal and a reference voltage signal corresponding to a predetermined speed;

means for switching the first and second phase difference detection signals in response to the switching control signal; and an output driving circuit for outputting a phase difference signal in response to the first and second phase difference detection signals passed through said means for switching.

4. A spindle servo circuit in an optical disc reproducing apparatus according to claim 3, wherein said predetermined speed is 1.5 times greater than a normal reproduction speed.

5. A spindle servo circuit in an optical disc reproducing apparatus comprising:

a spindle servo controlling unit for generating a frame clock signal by dividing a reproduced bit clock signal, detecting a phase difference detection signal by comparing the frame clock signal and a reference clock signal, and generating a revolution speed control signal of a spindle motor by low-pass filtering the detected phase difference detection signal;

a motor driving unit for driving the spindle motor in response to the revolution speed control signal;

a high frequency amplifier for outputting an EFM signal by amplifying and wave-shaping a high frequency signal reproduced from a compact disc rotated by the spindle motor; and an EFM demodulation circuit unit for generating the reproduced bit clock signal from the EFM signal subject to the condition of maintaining generation of the reproduced bit clock signal of a previous state when the revolution speed control signal exceeds a predetermined value.

* * * * *